(12) United States Patent
Kitagami et al.

(10) Patent No.: US 11,682,508 B2
(45) Date of Patent: Jun. 20, 2023

(54) COMPOSITE MAGNETIC POWDER, POWDER MAGNETIC CORE USING THE SAME, AND MANUFACTURING METHOD FOR COMPOSITE MAGNETIC POWDER

(71) Applicant: TDK CORPORATION, Tokyo (JP)

(72) Inventors: Masataka Kitagami, Tokyo (JP); Kenichi Kawabata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 219 days.

(21) Appl. No.: 16/925,633

(22) Filed: Jul. 10, 2020

(65) Prior Publication Data
US 2021/0027923 A1 Jan. 28, 2021

(30) Foreign Application Priority Data

Jul. 25, 2019 (JP) ................. 2019-136713

(51) Int. Cl.
| | |
|---|---|
| *H01F 1/147* | (2006.01) |
| *H01F 3/08* | (2006.01) |
| *H01F 41/02* | (2006.01) |
| *B01J 2/00* | (2006.01) |

(52) U.S. Cl.
CPC ............ *H01F 1/1475* (2013.01); *B01J 2/006* (2013.01); *H01F 3/08* (2013.01); *H01F 41/026* (2013.01)

(58) Field of Classification Search
None
See application file for complete search history.

(56) References Cited

U.S. PATENT DOCUMENTS

| | | | |
|---|---|---|---|
| 2007/0128439 A1 | 6/2007 | Kim et al. | |
| 2010/0193726 A1 | 8/2010 | Maeda et al. | |
| 2015/0129794 A1* | 5/2015 | Kobayashi | B22F 3/105 252/62.55 |
| 2019/0210104 A1 | 7/2019 | Yamaji et al. | |

FOREIGN PATENT DOCUMENTS

| | | |
|---|---|---|
| JP | 2000160205 A | 6/2000 |
| JP | 2009120915 A | 6/2009 |
| JP | 2009-302165 A | 12/2009 |
| WO | 2009028486 A1 | 3/2009 |

* cited by examiner

*Primary Examiner* — Alexandre F Ferre
(74) *Attorney, Agent, or Firm* — Young Law Firm, P.C.

(57) ABSTRACT

Disclosed herein is a composite magnetic powder that includes an iron-containing magnetic powder and an insulating layer comprising a silicon oxide formed on a surface of the iron-containing magnetic powder. The insulating layer contains pores, and an area ratio of the pores in a cross section of the insulating layer is 5% or less.

2 Claims, 3 Drawing Sheets

COMPOSITE MAGNETIC POWDER, POWDER MAGNETIC CORE USING THE SAME, AND MANUFACTURING METHOD FOR COMPOSITE MAGNETIC POWDER

BACKGROUND OF THE INVENTION

Field of the Invention

The present invention relates to composite magnetic powders and a powder magnetic core using the same and, more particularly, to composite magnetic powders each obtained by coating the surface of an iron-containing magnetic powder with an insulating layer and a powder magnetic core using the same. The present invention relates also to a manufacturing method for such composite magnetic powders.

Description of Related Art

A composite magnetic powder obtained by coating the surface of an iron powder with an insulating layer is described in JP 2009-120915A and WO 2009/028486. JP 2009-120915A discloses a method of forming an insulating layer through phosphating of the iron powder surface. WO 2009/028486 discloses a method of coating an iron powder with an insulating layer containing an organic group derived from an organic matter containing titanium, aluminum, and/or other materials.

However, it has been found that the composite magnetic powder described in JP 2009-120915A and WO 2009/028486 is significantly reduced in the insulating property of the insulating layer as a result of heat resistance test where the powder is left for a long time in a high temperature environment. Thus, the composite magnetic powder described in JP 2009-120915A and WO 2009/028486 is not necessarily suitable for applications where the powder can be exposed to a high temperature environment.

SUMMARY

It is therefore an object of the present invention to provide composite magnetic powders capable of maintaining a high insulating property even after being subjected to heat resistance test where the powders are left for a long time in a high temperature environment, a powder magnetic core using the same, and a manufacturing method for such composite magnetic powders.

Composite magnetic powders according to the present invention are each obtained by coating the surface of an iron-containing magnetic powder with an insulating layer formed of a silicon oxide. The insulating layer contains pores, and the area ratio of the pores in the cross section of the insulating layer is 5% or less. A powder magnetic core according to the present invention contains the above composite magnetic powders and a resin.

According to the present invention, since the area ratio of the pores in the cross section of the insulating layer is 5% or less, diffusion of the iron contained in the magnetic powder is suppressed. Thus, the insulating property of the insulating layer can be maintained at a sufficient level even after heat resistance test where the composite magnetic powders are left for a long time in a high temperature environment.

In the present invention, the average grain size of the silicon oxide constituting the insulating layer may be 6 nm or less. This allows a further reduction in the area ratio of the pores.

A composite magnetic powder manufacturing method according to an aspect of the present invention includes dropping a silicon ethoxide to a liquid with dispersed iron-containing magnetic powders to coat the surfaces of the magnetic powders with an insulating layer formed of a silicon oxide. The temperature of the liquid during dropping is set to 40° C. or less, and the dropping rate of the silicon ethoxide is set to 3 g/hour or less per 100 ml of liquid.

A composite magnetic powder manufacturing method according to another aspect of the present invention includes dropping a silicon ethoxide to a liquid with dispersed iron-containing magnetic powders to coat the surfaces of the magnetic powders with an insulating layer formed of a silicon oxide. The temperature of the liquid during dropping is set to 30° C. or less, and the dropping rate of the silicon ethoxide is set to 6 g/hour or less per 100 ml of liquid.

With the above methods, it is possible to manufacture composite magnetic powders in each of which the area ratio of the pores in the cross section of the insulating layer is 5% or less.

As described above, according to the present invention, there can be provided composite magnetic powders capable of maintaining a high insulating property even after being subjected to heat resistance test where the powders are left for a long time in a high temperature environment, a powder magnetic core using the same, and a manufacturing method for such composite magnetic powders.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

Figure 1:
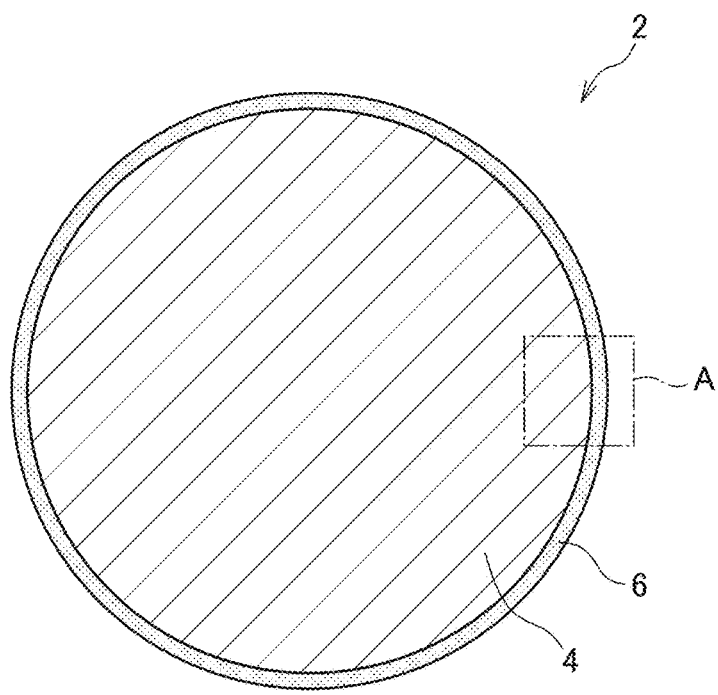
FIG. 1 is a schematic cross-sectional view of a composite magnetic powder according to a preferred embodiment of the present invention.

FIG. 1 is a schematic cross-sectional view of a composite magnetic powder 2 according to a preferred embodiment of the present invention.

As illustrated in FIG. 1, the composite magnetic powder according to the present embodiment contains an iron-containing magnetic powder 4 whose surface is coated with an insulating layer 6 formed of a silicon oxide. In the example of FIG. 1, the magnetic powder 4 has a spherical shape, but not limited thereto. The material constituting the magnetic powder 4 is not particularly limited and may be any material that contains iron and a soft magnetic property, such as pure iron, an Fe—Ni based magnetic alloy, or an Fe—Si based magnetic alloy. The grain size of the magnetic powder 4 is also not particularly limited and, for example, the magnetic powder 4 having a spherical shape has a grain size of about 1 μm to about 100 μm. Magnetic powders 4 to be used may have different grain size distributions. The insulating layer 6 is an inorganic film formed of a silicon oxide. In the present invention, the insulating layer 6 may not necessarily be complete $SiO_2$ and may be an oxygen-rich silicon oxide.

Figure 2:
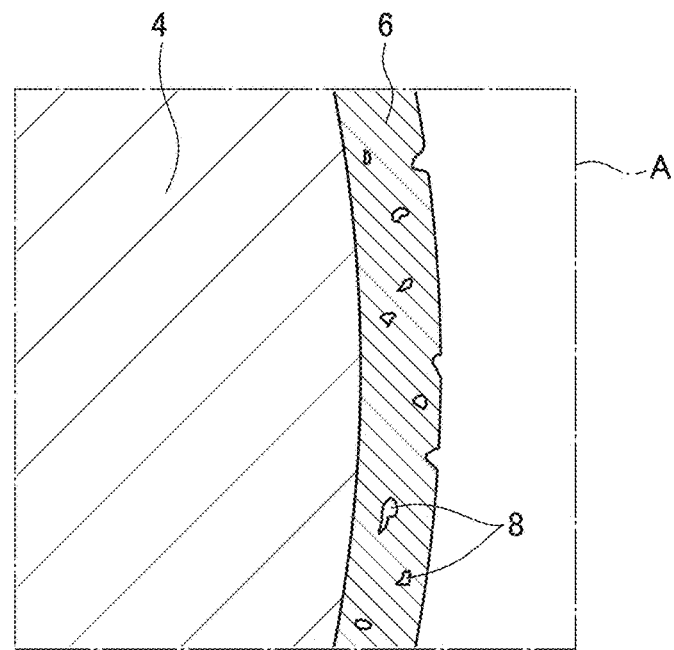
FIG. 2 is a schematic enlarged view of an area A indicated in FIG. 1.

FIG. 2 is a schematic enlarged view of an area A indicated in FIG. 1.

As illustrated in FIG. 2, the insulating layer 6 covering the surface of the magnetic powder 4 includes many pores 8, which means that the insulating layer 6 is not a completely dense film but has a portion where the silicon oxide is not present. Although not particularly limited, the thickness of the insulating layer 6 may be set to about 5 nm to about 200 nm. To maintain a sufficient insulting property after heat resistance test, the insulating layer 6 is preferably as dense as possible. In other words, the ratio of the pores 8 in the insulating layer 6 is preferably small. This is because iron in the magnetic powder 4 that is oxidized by heat diffuses to the surface of the insulating layer 6 along the pores 8, and a large ratio of the pores 8 disadvantageously allows easy diffusion of the iron oxide. Specifically, to maintain a sufficient insulting property after heat resistance test, the area ratio of the pores 8 in the cross section of the insulating layer 6 needs to be 5% or less. To reduce the area ratio of the pores 8, the grain size of the silicon oxide constituting the insulating layer 6 is preferably as small as possible. This is because when the insulating layer 6 is constituted by an aggregate of the silicon oxide having a large grain size, the size of the pores 8 inevitably increases, with the result that the iron oxide easily diffuses. Specifically, the average grain size of the silicon oxide constituting the insulating layer 6 is preferably 6 nm or less.

As described above, in the composite magnetic powder 2 according to the present embodiment, the surface of the iron-containing magnetic powder 4 is coated with the insulating layer 6 formed of the silicon oxide, and the area ratio of the pores in the cross section of the insulating layer 6 is 5% or less. Thus, even when the composite magnetic powder 2 is exposed to a high temperature, diffusion of the iron contained in the magnetic powder 4 is suppressed. This allows the insulating property of the insulating layer 6 to be maintained at a sufficient level even after the composite magnetic powder 2 is subjected to heat resistance test where it is left for a long time in a high temperature environment.

The O/Si ratio of the silicon oxide constituting the insulating layer 6 may range from 2.1 to 2.2. The theoretical O/Si ratio of the silicon oxide is 2; however, when the insulating layer 6 is formed of a silicon oxide through hydrolysis of a silicon ethoxide, the silicon oxide is rich in oxygen, and the O/Si ratio of the silicon oxide exceeds 2.2. In high temperature environments, a silicon oxide having an O/Si ratio exceeding 2.2 easily transmits oxygen, oxidizing iron contained in the magnetic powder 4, which makes the iron oxide more likely to diffuse to the surface of the insulating layer 6. On the other hand, when the O/Si ratio of the silicon oxide constituting the insulating layer 6 is 2.2 or less, dense film quality is achieved, making the silicon oxide less likely to transmit oxygen even in a high temperature environment. This makes iron contained in the magnetic powder 4 less likely to be oxidized and thus less likely to diffuse. The transmissivity of oxygen is reduced as the O/Si ratio of the silicon oxide approaches 2; however, it is difficult to reduce the O/Si ratio of the silicon oxide formed through the hydrolysis of silicon ethoxide to less than 2.1.

The composite magnetic powder 2 according to the present embodiment is molded using a resin into a powder magnetic core. The obtained powder magnetic core is used in coil components such as an inductor, a reactor, a choke coil, and a transformer, or used in motors. According to the present embodiment, the insulating property of the insulating layer 6 can be maintained at a sufficient level even when the coil component or a motor is used in a severe temperature environment, allowing improvement in product reliability.

The following describes a manufacturing method for the composite magnetic powder 2 according to the present embodiment.

The manufacturing method for the composite magnetic powder 2 according to the present embodiment is as follows. First, the magnetic powders 4 are prepared. The prepared magnetic powders 4 are put into a liquid such as ethanol and dispersed therein. Then, silicon ethoxide (TEOS) is gradually added dropwise while the liquid with the dispersed magnetic powders 4 is maintained at a predetermined temperature. The added silicon ethoxide is gradually hydrolyzed, with the result that the surfaces of the magnetic powders 4 are coated with the insulating layer 6 formed of a silicon oxide. At this time, the silicon oxide generated through the hydrolysis of the silicon ethoxide is not only precipitated to the surfaces of the magnetic powders 4, but also precipitated in the liquid by self-reaction. When precipitation of the silicon oxide in the liquid by self-reaction predominates, crystal grains grow in the liquid by self-reaction, with the result that silicon oxide having a large grain size adheres to the surfaces of the magnetic powders 4. It follows that the size of the pores 8 formed in the insulating layer 6 is increased to increase the area ratio of the pores 8 in the cross section of the insulating layer 6.

To reduce the area ratio of the pores 8 in the cross section of the insulating layer 6 to 5% or less, it is necessary to suppress the self-reaction of the silicon ethoxide in the liquid. To suppress the self-reaction of the silicon ethoxide in the liquid, for example, the temperature of the liquid is set to 40° C. or less, preferably, in the range of 20° C. to 30°, and the concentration of the silicon ethoxide in the liquid is maintained at a lower level. To maintain the concentration of the silicon ethoxide in the liquid at a lower level, a predetermined amount of the silicon ethoxide is put into the liquid not at a time but dropwise over time (i.e., gradually). Specifically, the silicon ethoxide is preferably added at a dropping rate of 6 g/hour or less per 100 ml of liquid, more preferably, 3 g/hour or less per 100 ml of liquid.

After reaction, the liquid is washed, diluted, and filtered to extract the composite magnetic powders 2. The extracted composite magnetic powders 2 are dried and then subjected to heat treatment under a nitrogen atmosphere. This completes the composite magnetic powders 2 according to the present embodiment.

The above heat treatment may be performed at a temperature of 600° C. or more and 900° C. or less under an atmosphere containing hydrogen. When the heat treatment is performed under an atmosphere containing hydrogen, the silicon oxide gradually becomes complete from its incomplete state, enhancing the density of the insulating layer 6. Through this process, the silicon oxide having an initial O/si ratio exceeding 2.2 is modified to have an O/Si ratio falling within the range of 2.1 to 2.2. The heat treatment time should be about one hour when the heat treatment temperature is in the range of 600° C. to 800° C. and about 10 minutes when the heat treatment temperature is in the range of 800° C. to 900° C. A temperature rising rate at the start of the heat treatment should be set in the range of 200° C./hour to 400° C./hour.

It is apparent that the present invention is not limited to the above embodiments, but may be modified and changed without departing from the scope and spirit of the invention.

EXAMPLES

Example 1

Fe powders having an average grain size of 3 μm were put into a vessel, and 100 ml ethanol was added per 30 g of Fe powders, whereby the Fe powders were dispersed in a liquid composed of ethanol. Then, the vessel was placed in an oil bath to maintain the temperature of the liquid at 20° C. In this state, 2 g of aqueous ammonia (ammonia concentration of 29 wt %) and 18 g water were added to the vessel, and 6 g silicon ethoxide mixed in 6 ml ethanol was dropped over two hours with stirring. Thus, the dropping rate of the silicon ethoxide was 3 g/hour per 100 ml ethanol. The reaction was conducted over three hours from the start of dropping of the silicon ethoxide. After completion of the reaction, the resultant mixture was diluted and washed with a sufficient amount of ethanol and then filtered, whereby composite magnetic powders were extracted. The extracted composite magnetic powders were dried at 180° C. for eight hours in a vacuum drier. The resultant composite magnetic powders were subjected to heat treatment in a rotary tube furnace at 650° C. under a nitrogen atmosphere for 30 minutes. In this way, composite magnetic powders of Example 1 were obtained.

Example 2

Composite magnetic powders of Example 2 were obtained in the same way as in Example 1 except that 6 g silicon ethoxide mixed in 6 ml ethanol was dropped over one hour. Thus, the dropping rate of the silicon ethoxide was 6 g/hour per 100 ml of ethanol.

Example 3

Composite magnetic powders of Example 3 were obtained in the same way as in Example 1 except that the liquid temperature during reaction was set to 30° C.

Example 4

Composite magnetic powders of Example 4 were obtained in the same way as in Example 1 except that the liquid temperature during reaction was set to 40° C.

Comparative Example 1

Composite magnetic powders of Comparative Example 1 were obtained in the same way as in Example 2 except that the liquid temperature during reaction was set to 40° C.

(Measurement of Porosity)

The composite magnetic powders of Examples 1 to 4 and Comparative Example 1 were individually kneaded in epoxy resin and added with a curing agent to be thermally cured, whereby measurement samples were obtained. The obtained samples were then each cut into a thin piece using an FIB (Focused Ion Beam) system, and the thin piece was fixed on a sample holder of a TEM (Transmission Electron Microscopy). Further, the thickness of the thin piece was reduced to about 100 nm by using the FIB, and an image (200,000× magnification) was obtained by using an STEM (Scanning Transmission Electron Microscopy). The area of an insulation layer in the obtained image was binarized, and the ratio of the pores was converted into an area, whereby a porosity was calculated.

(Measurement of Grain Size)

The sample used in the calculation of the porosity was used to obtain an image (1,000,000× magnification) in the TEM mode of the STEM. The average value of the size of the grains constituting the insulating layer was calculated from the obtained image.

(Measurement of Volume Resistivity)

The composite magnetic powders of Examples 1 to 4 and Comparative Example 1 were individually weighed to be 5 g. The weighed composite magnetic powders were put into the measurement jig of Hiresta-UX MCP-HT800 manufactured by Mitsubishi Chemical Analytech Co., Ltd. After that, the volume resistivity was measured under conditions that 1 V was applied to a measurement electrode with a diameter of 10 mm and that a pressure of 20 kN was applied to the composite magnetic powders. The measurement was carried out before and after heat resistance test where the composite magnetic powders were left for 1,000 hours in an environment of 150° C.

(Evaluation Results)

Table 1 shows the evaluation results of the sample composite magnetic powders.

TABLE 1

| | Reaction Temperature | Dropping Rate | Porosity | Grain Size | Volume Resistivity | |
| --- | --- | --- | --- | --- | --- | --- |
| | | | | | Before Heat Resistance Test | After Heat Resistance Test |
| Example 1 | 20° C. | 3 g/hr | 0.2% | 3 nm | $2.8 \times 10^9 \Omega \cdot cm$ | $3.1 \times 10^9 \Omega \cdot cm$ |
| Example 2 | 20° C. | 6 g/hr | 1.1% | 3 nm | $2.4 \times 10^9 \Omega \cdot cm$ | $3.0 \times 10^9 \Omega \cdot cm$ |
| Example 3 | 30° C. | 3 g/hr | 3.2% | 4 nm | $1.2 \times 10^9 \Omega \cdot cm$ | $2.7 \times 10^9 \Omega \cdot cm$ |
| Example 4 | 40° C. | 3 g/hr | 4.8% | 6 nm | $9.8 \times 10^8 \Omega \cdot cm$ | $1.9 \times 10^9 \Omega \cdot cm$ |
| Comparative Example 1 | 40° C. | 6 g/hr | 5.2% | 10 nm | $1.2 \times 10^8 \Omega \cdot cm$ | $3.3 \times 10^6 \Omega \cdot cm$ |

As shown in Table 1, the porosities of the insulating layers in the composite magnetic powders of Examples 1 to 4 were 4.8% or less, while the porosity of the insulating layer in the composite magnetic powder of Comparative Example 1 was 5.2%. Further, the grain sizes of the insulating layers in the composite magnetic powders of Examples 1 to 4 were 6 nm or less, while the grain size of the insulating layer in the composite magnetic powder of Comparative Example 1 was 10 nm.

For the volume resistivity before heat resistance test, there was no significant difference between Examples 1 to 4 and Comparative Example 1. However, after heat resistance test, the volume resistivity of the composite magnetic powders of Comparative Example 1 significantly decreased. On the other hand, the volume resistivities of the composite magnetic powders of Examples 1 to 4 did not significantly change before and after heat resistance test.

Figure 3:
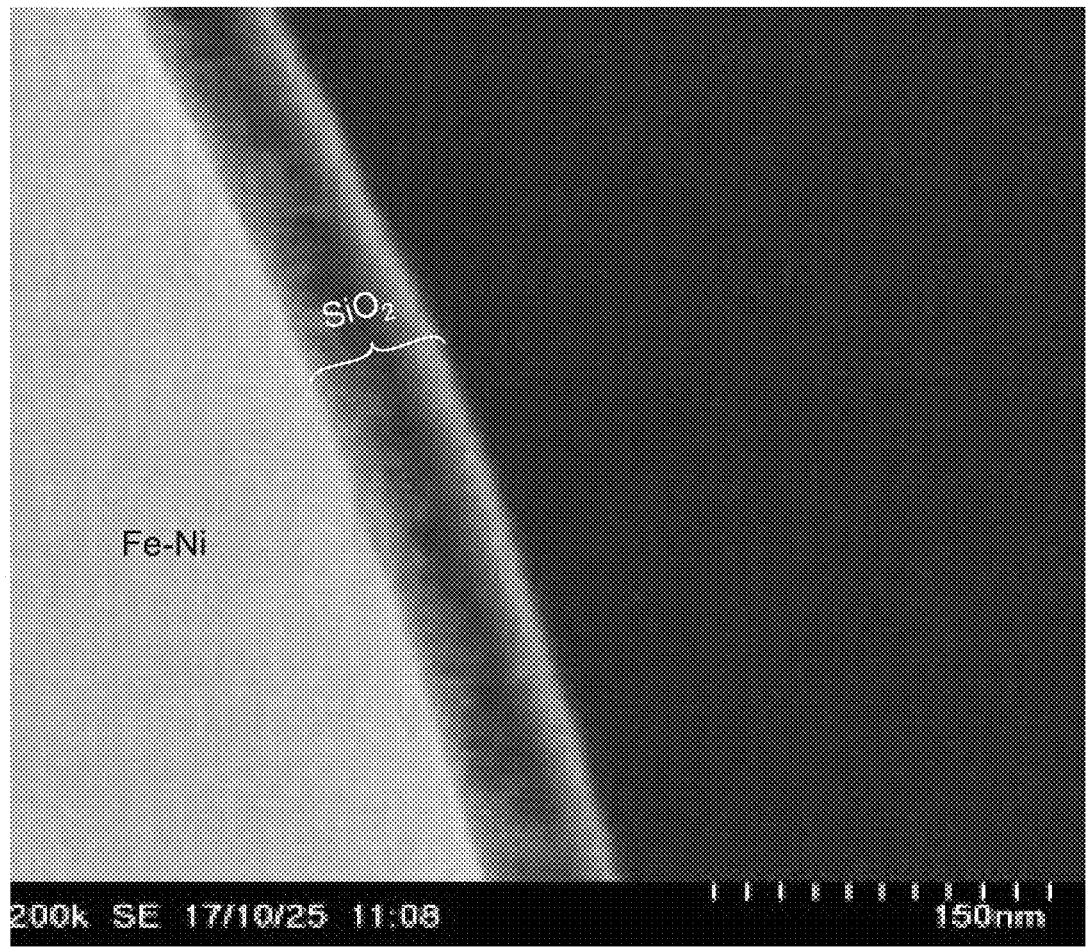
FIG. 3 is a part of the image used in the porosity measurement of the composite magnetic powder of Example 1.
Figure 4:
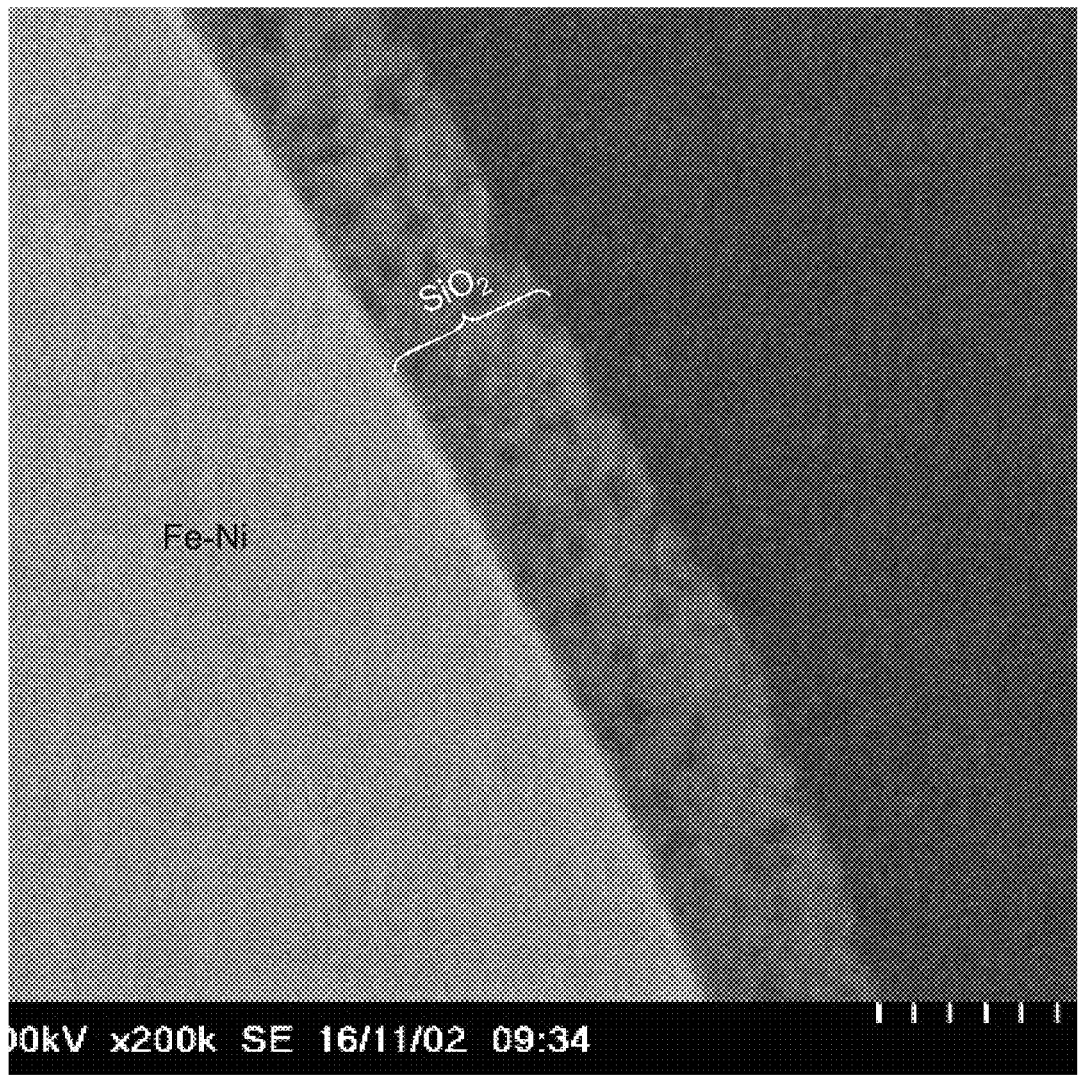
FIG. 4 is a part of the image used in the porosity measurement of the composite magnetic powder of Comparative Example 1.

FIG. 3 is a part of the image used in the porosity measurement of the composite magnetic powder of Example 1. FIG. 4 is a part of the image used in the porosity measurement of the composite magnetic powder of Comparative Example 1. As can be seen from FIG. 3, in the composite magnetic powder of Example 1, the insulating layer is dense, and almost no pores are observed, while in the Comparative example 1, the insulating layer is sparse, and many pores are observed.

What is claimed is:

1. A composite magnetic powder comprising:
   an iron-containing magnetic powder; and
   an insulating layer comprising a silicon oxide formed on a surface of the iron-containing magnetic powder,
   wherein the insulating layer contains pores,
   wherein an area ratio of the pores in a cross section of the insulating layer is 5% or less, and
   wherein an average grain size of the silicon oxide constituting the insulating layer is 6 nm or less.

2. A powder magnetic core including a composite magnetic powder, the composite magnetic powder comprising:
   an iron-containing magnetic powder; and
   an insulating layer comprising a silicon oxide formed on a surface of the iron-containing magnetic powder,
   wherein the insulating layer contains pores,
   wherein an area ratio of the pores in a cross section of the insulating layer is 5% or less, and
   wherein an average grain size of the silicon oxide constituting the insulating layer is 6 nm or less.

* * * * *